March 12, 1963 R. LOISEAU 3,080,970
METHOD AND MEANS FOR CLEANING SEEDS
Filed May 17, 1960 3 Sheets-Sheet 1
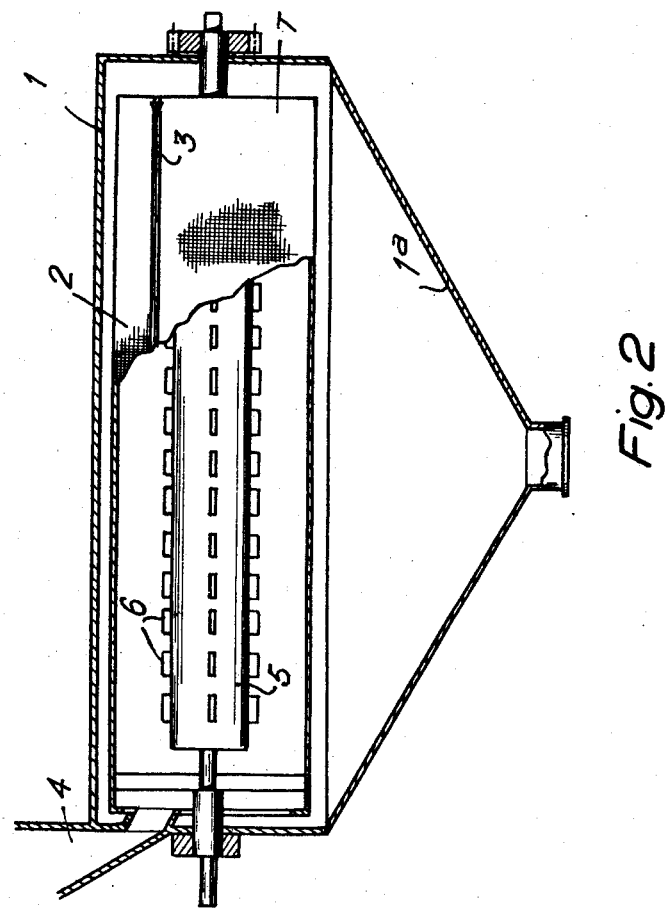
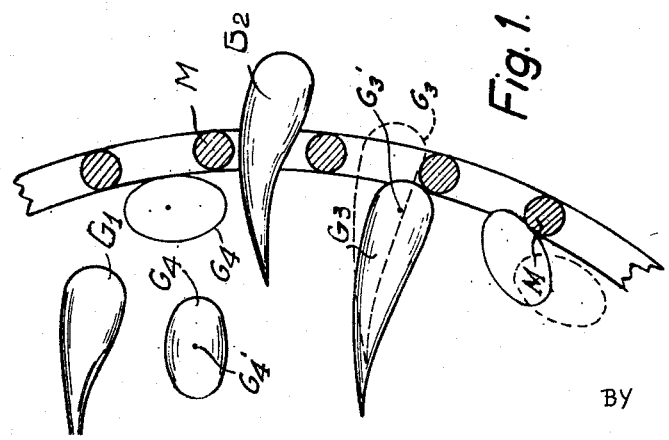
Roger Loiseau
INVENTOR
BY
Karl F. Ross
Agent March 12, 1963 R. LOISEAU 3,080,970
METHOD AND MEANS FOR CLEANING SEEDS
Filed May 17, 1960 3 Sheets-Sheet 2
FIG.3
FIG.4
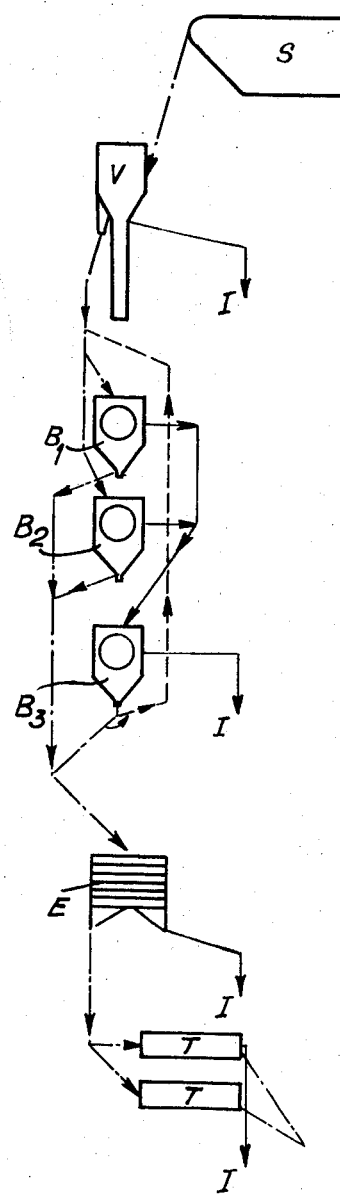
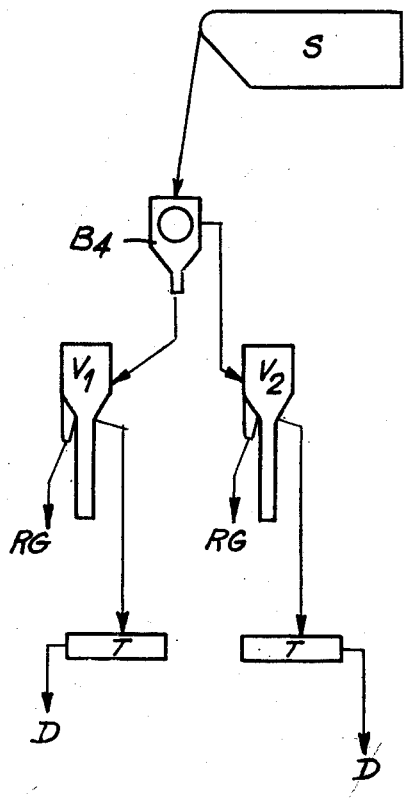
Roger Loiseau
INVENTOR
BY Karl F. Ross
Agent March 12, 1963  R. LOISEAU  3,080,970
METHOD AND MEANS FOR CLEANING SEEDS
Filed May 17, 1960  3 Sheets-Sheet 3
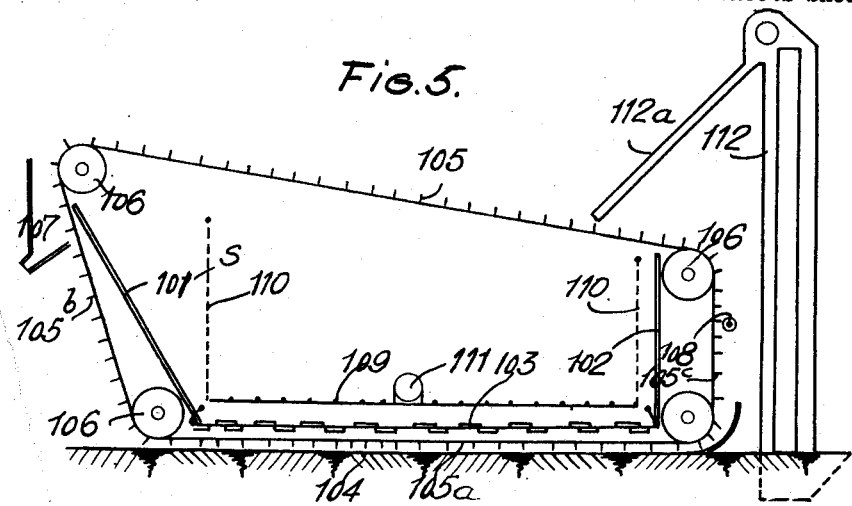
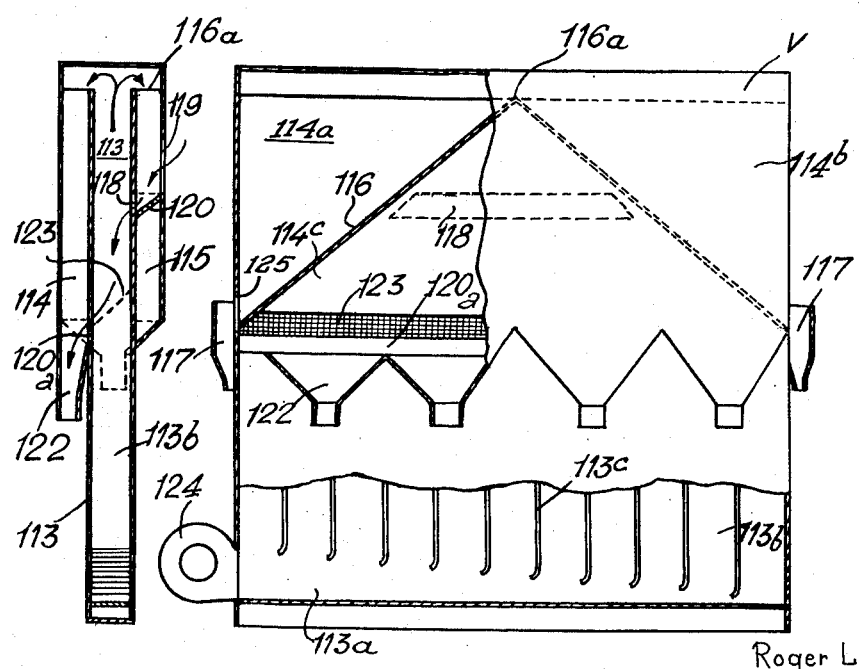
Roger Loiseau
INVENTOR
BY
Karl F. Ross
Agent

United States Patent Office 3,080,970
Patented Mar. 12, 1963

3,080,970
METHOD AND MEANS FOR CLEANING SEEDS
Roger Loiseau, 157 Rue Gambetta, Le Mans, France
Filed May 17, 1960, Ser. No. 29,614
Claims priority, application France Sept. 22, 1959
2 Claims. (Cl. 209—263)

This invention relates to methods of and means for separating grains or seeds having different characteristics, notably seeds having their center of gravity located differently according to their kind or species.

Certain seeds of gramineous plants, or grass seeds, for example the "Dactylis glomerata," have their caryopsis surrounded by an envelope forming a kind of extension at one end of the seed, the length of this envelope being equal to or greater than that of said caryopsis. As a results, the center of gravity is offset so that when the seed is thrown with force it takes a position similar to that of a flying dart.

On this basis I have devised an improved method of sorting these gramineous seeds, that is, separating them into their different species and/or qualities.

This method comprises essentially the steps of setting the seeds in motion so as to orient them and interposing a sieve in their path, so that as a consequence of their inertia only those seeds corresponding to the characteristics of the predetermined sorting operation will pass through said sieve.

It is another object of this invention to provide a rotary separator for carrying out the method broadly set forth hereinabove.

The separator for carrying out this method is characterized in that it comprises a first fixed space communicating with a hopper for recovering the sorted seeds, another space lmited by a sieve and mounted within said first space, a spout for feeding the product to be sorted, and an agitator rotatably mounted in said other space.

It is also within the scope of this invention to provide an installation adapted to impart a maximum efficiency to said rotary separator.

This installation is characterized in that it comprises a device of the type set forth, in combination with a blower device for separating the heavier products from the lighter products.

With the foregoing and other objects in view, the invention resides in the method broadly set forth hereinabove and in specific means for carrying out this method, which comprise a novel arrangement and combination of parts, and also in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which:

FIGURE 1 is a diagrammatic sectional view showing the principle of the method of this invention;

FIGURE 2 is an axial section showing an apparatus for carrying out the method of this invention;

FIGURE 3 is a diagram showing a typical installation constructed according to the teachings of this invention;

FIGURE 4 is another diagram showing a simplified and modified embodiment of the invention, applicable notably to the separation or sorting of Dactylis glomerata and Ray grass seeds;

FIGURE 5 is a diagrammatic sectional view showing a feed hopper incorporating the devices of this invention;

FIGURE 6 is a diagrammatic section showing a blower assembly; and

FIGURE 7 is an elevational and fragmentary section of the same device.

It will be readily understood that if gramineous seeds having an eccentric caryopsis, such as G1, G2 and G3 are thrown at a relatively high speed they will fly like darts and be kept in a certain orientation due to the tail-forming extension of their envelopes.

If a sieve M is so placed as to extend substantially at right angles to the direction in which the seeds are projected, only the seeds having an eccentric caryopsis may pass through the mesh, as the wire mesh gauge exceeds but only slightly the diameter of these seeds, the central-cored seeds (as at G4 in this example) striking the sieve surface and dropping without passing therethrough.

As will be seen in FIG. 2, the material utilized to this end is particularly simple.

In a closed space 1 of which the lower portion constitutes a hopper 1a for recovering the selected products there is mounted for slow rotation a cylinder or drum 2 having its cylindrical wall lined with a sieve M consisting preferably of a sheet having its two longitudinal edges assembled by a slide fastener 3.

This space communicates at its upper side portion with a feed spout 4 and at its lower side portion with means (not shown, but of same design as the feed spout device) for discharging the waste products.

Furthermore, within the cylinder 2 there is rotatably mounted a drum 5 carrying radial blades 6. The drum is driven at a relatively high speed, for example of the order of 400 r.p.m.

The function of these radial blades 6 is to throw the seeds against the sieve M.

The seeds of which the caryopsis has a tail-like extension (as at G1, G2, G3) will be oriented with their longitudinal axes at right angles to the sieve surface; if the sieve meshes are only slightly greater that the cross-sectional diameter of the seeds to be passed therethrough, only the seeds having this tail-like extension will pass through the sieve, the other seeds G4 falling to the bottom and being subsequently discharged through the outlet orifice of space 2.

This mesh to seed ratio is close to 1:1 and cannot be used with other sieving methods without showing abnormally low yields.

The general design of this device is somewhat similar to that of rotary bolter-sieves, but its operation differs completely therefrom.

Whereas in bolting devices the bran and flour mixture introduced into the cylindrical sieve is crushed against the inner side surface thereof so that the flour may be forced by friction through the sieve mesh while the bran falls back into the apparatus described hereinabove, the seeds enclosed in the sieve of the separator according to this invention are projected in a direction from the centre toward the periphery in order to impart the necessary orientation to these seeds so that some of them will pass through the sieve owing to the specific characteristics set forth hereinabove.

To sum up, the bolter-sieve operates only like an ordinary sieve since the product travels in layers parallel to the separating surface, whereas in the device of this invention the product is thrown in a direction substantially at right angles to this surface.

Some trimming-machines operate according to the principle of this bolter-sieve.

Separators equipped with separating cylinders are also known which rotate horizontally and are provided with scraper blades for lifting the product to be sorted and subsequently dropping it onto the lower wall.

It will be noted that although it appears that in the latter apparatus the seeds are directed substantially at right angles to the sieve surface, they are not thrown thereagainst with a force sufficient to enable them to pass through the sieve mesh besides, this passage is not possible for the sieve perforations are blocked by the seeds falling onto a layer of this mixture.

The separator according to the present invention is therefore advantageous in that it permits of separating seeds having very similar characteristics, for example the same weight and diameter.

To ensure the maximum efficiency of this separator the latter should be placed preferably in an installation comprising other devices for removing the other waste products. This result is obtained by means of the apparatus set forth hereinafter.

As shown in FIGURE 5, the hopper S comprises a chamber having four walls, that is, an inclined front wall 101, two side walls (not shown) also preferably inclined and a vertical rear plane 102. The dummy bottom 103, consisting of a riddle provided with adjustable apertures, overlies a solid bottom 104 raised at the rear end as will be explained presently. An endless scraper belt 105 passing over guide drums 106 travels along a path externally of the aforesaid space, its lower reach 105a passing between the dummy bottom 103 and the floor or solid bottom 104, while the front reach 105b is inclined to facilitate the discharge of products into the hopper 107; the rear reach 105c is vertical and travels past a photocell device 108 (comprising in the known manner source of light registering with a photo-electric cell which controls the motor of the vibrator 111 to oscillate a riddle 109 suspended by flexible members 110 which may be chains or cables).

The hopper 5 is fed by means of a bucket elevator 112 pouring the product into the feed spout 112a.

The operation of the installation described hereinabove will be readily understood. The raw product poured by the spout 112a falls between the walls constituting the chamber, the scraper blades of the upper reach of the endless belt carry along the product toward the front end of the apparatus when the natural angle of repose has been formed. The vibrating riddle 109 prevents vault formation by shaking and settling the mass thus accumulated.

Through the riddle 103 the product falls onto the floor or bottom 104 and is carried along by the blades of the lower reach 103a of endless belt 105 which, as it rises at 103c, lifts the seeds to pour them into the hopper 107.

The blower cleaning device V illustrated in FIGS. 6 and 7 comprises a central chamber 113 having contiguous lateral compartments 114, 115 of smaller vertical dimensions. Each lateral compartment 114 is divided into three portions 114a, 114b, 114c and by a bottom 116 forming a dihedron having its upper edge or ridge 116a level with the upper passage formed between these lateral compartments and the central chamber 113. The product sliding on this double-slope bottom is recovered by lateral hoppers 117.

The portion 114c (or 115c) overlying the bottom 116 communicates with the central chamber 113 through a relatively large aperture 118 extending over the greater part of width of portion 114c.

The product to be cleaned is introduced into the apparatus through an aperture 119 and due to the provision of a bridge 120 it flows into the space 113 through the passage 118 and may escape therefrom as will be explained presently either through the upper portion adjacent to the ridge 116a or through the passage 120a whereby the space 113 communicates with the lower portion of compartment 114 forming a plurality of hoppers 122.

An inclined grid 123 extends at the level of the aforesaid aperture 120a through the width of space 113.

The lower portion 113a of this space constitutes a blower caisson for receiving and distributing the low-pressure air blown by the fan 124 into the parallel and vertical funnels 113b leading to the space underlying the grid 123. The partitions 113c separating these funnels have their lower ends disposed along a level curve or slope inclined in the direction away from the fan in order properly to distribute the blown air, as shown in FIG. 7.

The raw product introduced through the aperture 119 slides along the bridge 120, meets the air stream blown by the fan 124 and guides by the vertical funnels 113b after passing through the grid 123. The heavier products (seeds) slide along this grid to the hoppers 122 through the passage 120a. The lighter (waste) products are carried along by the blown air stream and leave the space 113 at the upper portion thereof to fall back into the compartments 114a, 114b, from which they flow through the inclined bottoms 116 into the lateral hoppers 117 through apertures 125.

The raw product is also separated according to the density of its component elements.

The diagram of FIG. 3 illustrates the relative arrangement of the devices constituting the seed cleaning apparatus.

A silo S (of the type described hereinabove) feeds a separator V equipped with a fan. The waste products I are discharged immediately therefrom, and the heavier elements (seeds) are directed toward the partitions B (of the projection type described with reference to FIGS. 1 and 2).

By way of example, the device V may feed two separators B1 and B2, a third separator B3 being provided if desired for receiving the "wastes" from the other two so as to clean them another time. The lower hoppers of these various separators deliver their contents to a straw-removing device. The products received by the lower hopper of separator B3 may also be returned to the distributing column of device V in order to be again passed through the separators B1 and B2.

At the outlet end of the straw-removing device E the seeds are directed towards the conventional type sorting-honeycomb device and the seeds issuing from this device may be considered as sufficiently clean. At the various stages of the treatment the wastes are eliminated from the circuit; this discharge is indicated by the reference letter I.

It may happen that the raw product to be cleaned consists of a mixture of two seeds resembling considerably to each other, for instance as in the case of *Dactylis glomerata* seeds and Ray grass seeds; in this case the arrangement must be modified so that the silo S will deliver the products to a separator B4 (of same design as B1, B2, B3 cited hereinabove) of which the lower hopper delivers the sieved seeds to a device V1, whilst the "wastes" are directed to another device V2.

In this example the separator B4 acts somewhat like a sizer in that the *Dactylis glomerata* seeds (D) and Ray grass seeds (R.G.) are collected separately according to their size and not according to their kind. Given an equal cross-section, as the "D" seeds are lighter than the "R.G." seeds the devices V1 and V2 will separate them by density; the "D" seeds collected in hoppers 117 of V1 and V2 are then sieved through the honeycomb sieves T.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A method of centrifugally separating generally elongated kernels of a first and a second type of seed from each other, the kernels of said first type having an unequal weight distribution along their major axes, the kernels of said second type having a substantially equal weight distribution along their major axes, comprising the steps of imparting to said kernels an outward velocity sufficient to orient the major axes of the kernels of said first type in a radial direction, and intercepting said kernels with an apertured surface dimensioned to pass the so oriented kernels and to block the non-oriented kernels.

2. A method of separating generally elongated kernels of a first and a second type of seed from each other, the kernels of said first type having an unequal weight distribution along their major axes, the kernels of said second type having a substantially equal weight distribution along their major axes, the minor axes of said kernels being of approximately equal length, comprising the steps of hurling said kernels in a predetermined direction toward a sieve surface having openings of a diameter slightly greater than said length with a velocity sufficient to orient the major axes of the kernels of said first type in said predetermined direction, and intercepting said kernels with said sieve surface to pass the so oriented kernels and to block the non-oriented kernels.

References Cited in the file of this patent

UNITED STATES PATENTS

| | | |
|---|---|---|
| 40,767 | Miller | Dec. 1, 1863 |
| 387,057 | Eldred | July 31, 1888 |
| 490,652 | Higginbottom | Jan. 31, 1893 |
| 517,636 | Youngquist | Apr. 3, 1894 |
| 872,218 | Bowers | Nov. 26, 1907 |
| 1,152,920 | Seidl | Sept. 7, 1915 |
| 1,525,116 | Buel | Feb. 3, 1925 |
| 1,926,621 | Hoefling | Sept. 12, 1933 |
| 2,557,279 | Greenberg | June 19, 1951 |

FOREIGN PATENTS

| | | |
|---|---|---|
| 711,487 | France | Sept. 10, 1931 |
| 808,408 | Germany | July 16, 1951 |